Patented Oct. 2, 1923.

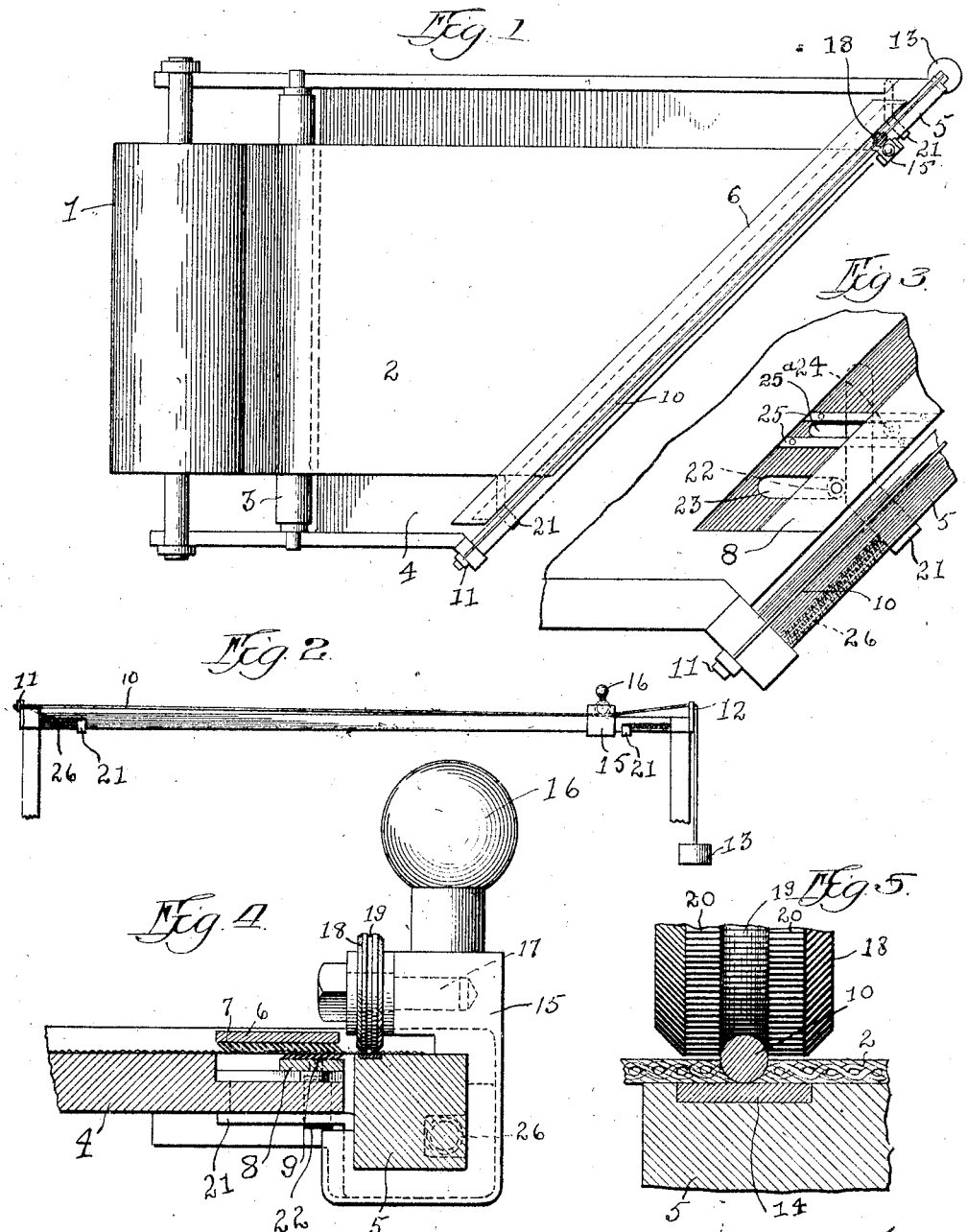

1,469,325

UNITED STATES PATENT OFFICE.

FRANK J. MacDONALD, OF AKRON, OHIO, ASSIGNOR TO THE FIRESTONE TIRE AND RUBBER COMPANY, OF AKRON, OHIO, A CORPORATION OF OHIO.

STOCK-CUTTING APPARATUS.

Application filed December 31, 1918. Serial No. 269,033.

*To all whom it may concern:*

Be it known that I, FRANK J. MACDONALD, a citizen of the United States, residing at Akron, in the county of Summit, State of Ohio, have invented certain new and useful Improvements in Stock-Cutting Apparatus, of which the following is a specification.

The subject matter of this invention relates to machines for cutting light flexible material of various kinds, which have heretofore presented difficulties in cutting by machinery owing to the lightness of the stock and its tendency to crawl or move before any ordinary cutting mechanism. This apparatus is suitable for use in many industries where the problem of cutting light flexible material is encountered and it is particularly useful in cutting light fabric impregnated with rubber such as used in the manufacture of rubber boots and shoes, or in cutting sheeted rubber gum or similar material.

Although the device is shown in detail, it is possible that the details may be varied within a wide scope without departing from the invention.

In the drawings—

Fig. 1 is a plan view of the stock cutting apparatus.

Fig. 2 is a side elevation.

Fig. 3 is an enlarged plan view showing the feeding mechanism.

Fig. 4 is a cross section through the cutter and feeding device.

Fig. 5 is an enlarged view of the cutting element.

In the drawing 1 represents the stock roll on which is wound the material to be cut. This may be light fabric, plain or rubberized, sheet rubber or any other material. The material, shown in Fig. 5 as rubberized fabric, is designated by the numeral 2, and passes from the roll 1 over a guide roller 3, on to a table 4 and over a cutter bar 5.

Any suitable mechanism may be devised for feeding the stock under the cutter. As an example, there is shown one form of feeding device which may be utilized, although any type of feeding mechanism may be substituted for it. It comprises a stationary bar or block 6, which is secured above the fabric, from the lower side of which extend a number of bristles or detents 7 which are inclined in the direction of the feed and prevent the fabric from withdrawing under the action of the reciprocating feed bar 8 which is carried on the table under the fabric and is arranged to be reciprocated in any suitable manner. The reciprocating feed bar carries a number of bristles or teeth 9 inclined toward the direction of feed. The bristles or detents 7 are adapted to wipe over the fabric when it is drawn forwardly and to also hold the fabric against rearward movement and the bristles 9 on the feed bar 8 are similarly adapted so that when the bar 8 is moved rearwardly they will wipe against the under surface of the fabric without crimping it or forcing it rearwardly. One method of reciprocating the feed bar is shown and will be described farther on in the specification.

In cutting fabric for many uses, it is the general practice to cut it "on the bias" or at an angle of 45°, and for this reason I have shown the cutter bar and feed bars at an angle of 45° to the fabric, but this arrangement is non-essential and the cutter bar may be arranged in any preferred manner with respect to the length of the stock. Along the bar there is arranged a cutter wire 10 secured at one end in an eye piece 11 at one extremity of the cutter bar, the other end of the wire passing through an eye 12 and having secured thereon a weight 13, which serves to hold the wire taut. Any other device for holding and maintaining a taut condition of the wire could be substituted for the weight. Under the line of the wire, the cutter bar is provided with an insert of hardened steel 14 to receive the wear from the cutter-wire.

Surrounding the cutter bar 5 is a U-shaped carriage or slide 15 which has secured to it a handle 16 by which it may be reciprocated back and forth over the cutter bar. The upper part of the slide carries a pin 17 on which is mounted a pressure element, here shown as a free roller 18, the periphery of which is formed with a groove 19 which fits over the wire and with cylinderical surfaces 20 at the sides of the groove, which are so arranged as to just clear the surface of the fabric in order that they may not touch the upper face of the material and cause it to creep. As shown in Fig. 2, the wire is normally slightly above the cutter bar, but the roller is so located that at the point it is received over the wire, the latter will be pressed down against the wear plate 14. If the carriage or slide 15 is reciprocated the length of the cutter bar, cloth or other material between the wire and the cutter bar will be severed by the pressure on the wire exerted by the roller. Any suitable form of traversing mechanism may be used to move the carriage back and forth over the cutter bar, and it may be possible to substitute other devices for the wire which will accomplish the same results. By the peculiar cutting arrangement shown, all tendency of the stock to crawl or creep before the cutter is eliminated and a straight and accurate cut may be obtained on the lightest material.

When the carriage is at the limits of its movements, any mechanical device may come into play for moving the reciprocating feed bar to advance the material under the cutting instrumentality. One form of device for this purpose is shown in the drawings and comprises shifting bar 21 slidably mounted on each end of the cutter bar, in the path of the roller carriage. The lower end of each shifter is bent at an angle and contacts a roller 22 projecting downwardly from the reciprocating feed bar and passing through a slot 23 in the forward end of the table. On the under side of the feed bar, are also arranged one or more rollers 24 which are received in trackways 25 and serve to keep the bar 8 in parallelism. The latter rollers also pass respectively through slots, one of which is shown at 25ª, in the table 4, and are likewise designed to be engaged respectively by the lower end of each shifter 21, for a purpose presently apparent.

The bar 8 is guided between the trackways 25 in any suitable manner so that it will not bind when it is reciprocated. A compression spring 26 is located between the end of the feed bar and the shifter serving to hold it outwardly. As the carriage approaches either end of its travel, the shifter arm 21 is forced against the roller 22, and the feed bar is drawn backwardly and as it resumes its motion in the other direction, said arm 21 engages the roller 24 and the feed bar is moved forward by the spring and the fabric is fed under the wire. Any desirable means may be employed for feeding the material under the cutting instrumentality without affecting the operation of the latter.

It will be observed that the device comprises a flexible cutting element which is held stationary and is pressed into the cloth by the roller. In this manner, creeping or moving of the fabric is prevented and the cut is straight and accurate, a result which is further enhanced by having the surface of the roller clear the surface of the material being operated upon, so that there is no rolling or moving pressure exerted. Material of the nature which this apparatus is designed to cut has presented so many difficulties that it has heretofore been an impractical matter to cut it by machinery and hand cutting has survived.

Changes and modifications may be made over the disclosure herein and I do not intend to be limited to details of the apparatus as shown, but consider it to cover broadly variations thereof within the province of mechanical skill.

I claim:

1. In an apparatus of the character described, the combination of a flexible cutting element normally spaced from the material, and a pressure device adapted to pass over said cutting element and force it into the material.

2. In an apparatus of the character described, the combination of a flexible stationary cutting element, and a pressure device adapted to pass over said cutting element and force it into the material.

3. In an apparatus of the character described, the combination of a taut cutting wire, and a pressure element movable over the wire to force it into the material.

4. In an apparatus of the character described, the combination of a bar, a cutting wire spaced from the bar, and a pressure roller movable along the bar and over the wire to force it against the surface of the bar.

5. In an apparatus of the character described, the combination of a cutter plate, a cutting wire spaced from the plate, and means movable over the wire to force it against the plate.

6. In an apparatus of the character described, the combination of a cutter bar, a flexible cutting element, means for supporting said cutting element above and spaced from said bar, and means movable over the element to force it against the bar.

7. In an apparatus of the character described, the combination of a cutter bar, a wire, means for supporting said wire above the bar, means for maintaining the wire in taut condition, and means movable over the wire to force it against the bar.

8. In an apparatus of the character described, the combination of a cutter bar, a cutting wire, means for supporting said wire spaced from the bar, means for maintaining the wire in taut condition, and a roller movable over the wire and so mounted as to force the wire against the bar.

9. In an apparatus for cutting sheet material, the combination of a cutter bar, a wire supported above said bar, a carriage movable along said bar, a pressure roller on said carriage resting on said wire and adapted to press it into the material.

10. In an apparatus for cutting sheet material, the combination of a cutter bar, a taut wire supported above said bar, a carriage movable along said bar, and a pressure roller mounted on said carriage and resting on said wire.

11. In an apparatus for cutting sheet material, the combination of a cutter bar, a carriage movable along said bar, a pressure element mounted on said carriage, a wire spaced from the bar, said element engaging said wire and forcing it into the material as it moves over the bar.

12. In an apparatus for cutting sheet material, the combination of a cutter bar, a carriage movable along said bar, a pressure element mounted on said carriage, a wire spaced from the bar, said element being grooved to receive said wire and force it into the material as it moves over the bar.

13. In an apparatus for cutting sheet material, a cutter bar, a taut wire above said bar, and a pressure element having sliding contact with the wire.

14. In an apparatus for cutting sheet material, a cutter bar, a wire spaced from said bar and out of contact with the material and a pressure element having sliding contact with the wire and adapted to force the wire into the material.

15. In an apparatus for cutting sheet material, a cutting surface, a flexible cutting element spaced from said surface and out of contact with the material, and a pressure element having sliding contact with the cutting element.

16. In an apparatus for cutting sheet material, a cutting surface, a flexible cutting element spaced from said surface, a pressure element provded with a recess to receive said cutting element and having sliding contact therewith.

17. In an apparatus for cutting sheet material, the combination of a cutter bar, a wire supported above said bar, a carriage movable along said bar, a grooved pressure roller on said carriage, the wire being received in the groove, and forced against and guided by the roller in its movement over the bar.

18. In an apparatus of the character described, the combination of a flexible cutting element, a pressure device adapted to pass over said cutting element and flex and force it into the material, and means to feed the material transversely of the cutting element.

19. In an apparatus of the character described, the combination of a bar, a cutting wire spaced from the bar, a pressure roller movable along the bar and over the wire to force it against the surface of the bar, and means to feed material over said bar.

20. In an apparatus for cutting sheet material, the combination of a cutter bar, a taut wire sppported above said bar, a carriage movable along said bar, a pressure roller mounted on said carriage and resting on said wire, and means to feed said material under the wire.

21. In an apparatus for cutting sheet material, the combination of a cutter bar, a carriage movable along said bar, a pressure element mounted on said carriage, a wire spaced from the bar, said element being grooved to receive said wire and force it into the material as it moves over the bar, and means to feed said material under the wire.

22. In an apparatus for cutting sheet material, a cutting surface, a flexible cutting element spaced from said surface, a pressure element provided with a recess to receive said cutting element and having sliding contact therewith, and means to feed said material under the wire.

23. In an apparatus for cutting sheet material, the combination of a cutter bar, a wire supported above said bar, a carriage movable along said bar, a grooved pressure roller on said carriage, the wire being received in the groove, and forced against and guided by the roller in its movement over the bar, and means to feed said material under the wire.

24. In an apparatus for cutting sheet material, the combination of a metallic cutter bar, a flexible metallic cutting element, a pressure device adapted to flex and force said cutting element into the material against said cutter bar.

25. In an apparatus for cutting sheet material, the combination of a cutter bar having inserted therein a metallic cutter plate, a flexible metallic cutting element, and a pressure device adapted to flex and force said cutting element into the material against said cutter plate.

26. In an apparatus for cutting sheet material, the combination of a metallic cutter plate, a flexible stationary metallic cutting element, and a pressure device adapted to pass over said cutting element to flex and force it into the material.

27. In an apparatus for cutting sheet material, the combination of a taut cutting wire, a meallic cutter plate, and a pressure element movable along the wire to force it into the material.

FRANK J. MacDONALD.